(12) United States Patent
Shimoyama et al.

(10) Patent No.: US 9,551,621 B2
(45) Date of Patent: Jan. 24, 2017

(54) PRESSURE SENSOR HAVING CANTILEVER AND DISPLACEMENT MEASUREMENT UNIT

(71) Applicants: SEIKO INSTRUMENTS INC., Chiba-shi, Chiba (JP); THE UNIVERSITY OF TOKYO, Tokyo (JP)

(72) Inventors: Isao Shimoyama, Tokyo (JP); Kiyoshi Matsumoto, Tokyo (JP); Hidetoshi Takahashi, Tokyo (JP); Minh-Dung Nguyen, Tokyo (JP); Yoko Shinohara, Chiba (JP); Takeshi Uchiyama, Chiba (JP); Manabu Oumi, Chiba (JP); Masataka Shinogi, Chiba (JP)

(73) Assignees: SEIKO INSTRUMENTS INC., Chiba (JP); THE UNIVERSITY OF TOKYO, Tokyo (JP)

( * ) Notice: Subject to any disclaimer, the term of this patent is extended or adjusted under 35 U.S.C. 154(b) by 143 days.

(21) Appl. No.: 14/394,647

(22) PCT Filed: Mar. 19, 2013

(86) PCT No.: PCT/JP2013/057765
§ 371 (c)(1),
(2) Date: Oct. 15, 2014

(87) PCT Pub. No.: WO2013/164927
PCT Pub. Date: Nov. 7, 2013

(65) Prior Publication Data
US 2015/0096388 A1 Apr. 9, 2015

(30) Foreign Application Priority Data
May 2, 2012 (JP) ................................. 2012-105306

(51) Int. Cl.
*G01L 11/00* (2006.01)
*G01L 7/08* (2006.01)
(Continued)

(52) U.S. Cl.
CPC . *G01L 1/16* (2013.01); *G01L 1/10* (2013.01); *G01L 9/0002* (2013.01);
(Continued)

(58) Field of Classification Search
None
See application file for complete search history.

(56) References Cited

U.S. PATENT DOCUMENTS 5,079,958 A * 1/1992 Takase ............... B82Y 35/00
73/150 R
5,279,162 A * 1/1994 Takebe ............... G01P 15/0802
257/26
(Continued)

FOREIGN PATENT DOCUMENTS

CN 1228837 A 9/1999
CN 1419113 A 5/2003
(Continued)

OTHER PUBLICATIONS

Oct. 12, 2015 Extended Search Report issued in European Patent Application No. 13785081.4.
(Continued)

*Primary Examiner* — Peter Macchiarolo
*Assistant Examiner* — Jermaine Jenkins
(74) *Attorney, Agent, or Firm* — Oliff PLC

(57) ABSTRACT

A pressure sensor includes a sensor body which has a first surface and a cavity with an opening in the first surface, a cantilever which has a base end portion supported on the first surface and a distal end portion provided to form a gap from a peripheral edge of the opening inside the opening, is
(Continued)

flexurally deformed according to a pressure difference between an inside and an outside of the cavity, and is formed of a semiconductor material, and a displacement measurement unit which measures a displacement of the cantilever vibrating according to the pressure difference at a frequency larger than a lower limit frequency $f_{LOW}$ (Hz) defined by Expression (1), where a width (μm) of the gap is represented by G, a volume (ml) of the cavity is represented by V, and a proportional constant is represented by k.

$$f_{LOW} = k \cdot (G^2/V) \quad (1)$$

6 Claims, 14 Drawing Sheets

(51) Int. Cl.
| | |
|---|---|
| G01L 13/02 | (2006.01) |
| G01L 15/00 | (2006.01) |
| G01L 9/00 | (2006.01) |
| G01L 9/16 | (2006.01) |
| G01L 1/16 | (2006.01) |
| G01L 13/06 | (2006.01) |
| G01L 1/10 | (2006.01) |
| G01L 23/04 | (2006.01) |

(52) U.S. Cl.
CPC ............ G01L 9/0045 (2013.01); G01L 13/06 (2013.01); G01L 23/04 (2013.01); G01L 9/008 (2013.01)

(56) References Cited

U.S. PATENT DOCUMENTS

| | | | | |
|---|---|---|---|---|
| 5,293,095 | A | | 3/1994 | Tamura et al. |
| 6,158,283 | A | * | 12/2000 | Shinogi ................ B81B 7/0077 73/514.33 |
| 7,223,624 | B2 | * | 5/2007 | Wu ..................... B60C 23/0408 438/52 |
| 7,584,666 | B2 | * | 9/2009 | Kim ....................... A61B 5/021 128/897 |
| 8,120,232 | B2 | * | 2/2012 | Daniel ...................... G01L 1/16 310/330 |
| 9,170,167 | B2 | * | 10/2015 | Uchiyama ............. G01L 9/0019 |
| 9,188,497 | B2 | * | 11/2015 | Shimoyama ........... H04R 21/02 |
| 2010/0024562 | A1 | | 2/2010 | Kurth et al. |
| 2014/0000378 | A1 | | 1/2014 | Shimoyama et al. |

FOREIGN PATENT DOCUMENTS

| | | |
|---|---|---|
| CN | 101256101 A | 9/2008 |
| CN | 102032970 A | 4/2011 |
| CN | 102297741 A | 12/2011 |
| JP | A-4-208827 | 7/1992 |
| JP | B-7-1215 | 1/1995 |
| JP | A-2009-537831 | 10/2009 |
| JP | 5674167 B2 | 2/2015 |
| WO | 2012/102073 A1 | 8/2012 |

OTHER PUBLICATIONS

Minh-Dung, N. et al., "Barometric Pressure Change Measurement", 2011, 16th International Solid-State Sensors, Actuators and Microsystems Conference (Transducers 2011); Beijing, China, Jun. 5-9, 2011, IEEE, Jun. 5, 2011, XP 331910554, pp. 898-901.

Jul. 14, 2015 Office Action issued in Chinese Patent Application No. 201380022589.9.

Jun. 16, 2015 Notice of Allowance issued in Japnanese Application No. 2012-105306.

Takahashi et al., "Air Pressure Difference on Artificial Insect Wing with MEMS Sensor", *The Japan Society of Mechanical Engineers*, 2009, pp. 135-136.

Takahashi et al., "Air Pressure Sensor for an Insect Wing," *Technical Digest of $22^{nd}$ IEEE International Conference on Micro Electro Mechanical Systems*, 2009, pp. 825-828.

International Search Report issued in International Application No. PCT/JP2013/057765 mailed Apr. 23, 2013 (with translation).

* cited by examiner

PRESSURE SENSOR HAVING CANTILEVER AND DISPLACEMENT MEASUREMENT UNIT

CROSS-REFERENCE TO RELATED APPLICATION

This is the U.S. National Phase Application under 35 U.S.C. §371 of International Patent Application No. PCT/JP2013/057765 filed Mar. 19, 2013, which designated the United States and was published in a language other than English, which claims the benefit of Japanese Patent Application No. 2012-105306 filed on May 2, 2012, both of them are incorporated by reference herein. The International Application was published in Japanese on Nov. 7, 2013 as WO2013/164927 A1 under PCT Article 21(2).

BACKGROUND OF THE INVENTION

Field of the Invention

The present invention relates to a pressure sensor which detects pressure fluctuation based on a pressure difference.

Description of the Related Art

In the related art, as a pressure sensor (differential pressure sensor) which detects pressure fluctuation, for example, a pressure sensor including a substrate which has a through-hole or a recess portion, a storage container which has a vent hole, and a piezoelectric element which is provided inside the storage container and is cantilevered by the substrate to be vibratable inside the through-hole or the recess portion is known (see Japanese Unexamined Patent Application, First Publication No. H04-208827 (hereinafter, referred to as Patent Document 1)).

According to this pressure sensor, the piezoelectric element vibrates in response to pressure fluctuation transmitted to the inside of the storage container through the vent hole, and pressure fluctuation can be detected based on change in voltage of the piezoelectric element.

On the other hand, this type of pressure sensor is designed to detect pressure fluctuation within a frequency band according to the purpose of the pressure sensor. At this time, for example, in the pressure sensor of Patent Document 1, pressure fluctuation detection sensitivity is determined by the shape of the piezoelectric element, the volume of the through-hole or the recess portion, the flow rate between the through-hole or the recess portion and outside gas, and the like, and in particular, largely depends on the shape of the piezoelectric element.

However, since the piezoelectric element includes electrode films and the like on both surfaces of a piezoelectric body, reduction in thickness is rarely achieved, and a large amount of deformation is rarely secured. Accordingly, a piezoelectric sensor disclosed in Patent Document 1 has a limit on pressure fluctuation detection and is not enough to detect minute pressure fluctuation.

It is considered that the upper limit frequency of pressure fluctuation detectable by the piezoelectric sensor is near the resonance frequency of the piezoelectric element. In regard to a lower limit frequency, currently, no design guide has been obtained. For this reason, when the pressure fluctuates slowly, it is difficult to accurately understand what level of frequency is detectable, or the like.

Therefore, in order to obtain the lower limit frequency of pressure fluctuation detectable by the piezoelectric sensor, there is only a way to produce a plurality of types of piezoelectric sensors based on various design parameters and to combine a plurality of detections results of these piezoelectric sensors, thereby measuring the lower limit frequency. Accordingly, it is practically difficult to set the lower limit frequency detectable by the piezoelectric sensor to an arbitrary value.

SUMMARY OF THE INVENTION

The invention has been accomplished in consideration of this situation. An object of the invention is to provide a pressure sensor capable of detecting minute pressure fluctuation with high precision, setting the lower limit frequency of pressure fluctuation to a desired value, and arbitrarily setting a detectable frequency band of pressure fluctuation.

In order to solve the above-described problem, the invention provides the following means.

(1) A pressure sensor according to an aspect of the invention includes a sensor body which has a first surface and a cavity with an opening in the first surface, a cantilever which has a base end portion supported on the first surface and a distal end portion provided to form a gap from a peripheral edge of the opening inside the opening, the cantilever being flexurally deformed according to a pressure difference between an inside and an outside of the cavity, the cantilever being formed of a semiconductor material, and a displacement measurement unit which measures a displacement of the cantilever vibrating according to the pressure difference at a frequency larger than a lower limit frequency $f_{LOW}$ (Hz) defined by Expression (1), where a width (μm) of the gap is represented by G, a volume (ml) of the cavity is represented by V, and a proportional constant is represented by k.

$$f_{LOW}=k\cdot(G^2/V) \qquad (1)$$

In the pressure sensor according to the aspect of the invention, when the pressure outside the sensor fluctuates, a pressure difference is generated between the outside and the inside of the cavity, and the cantilever is flexurally deformed according to the pressure difference. After the deformation, a pressure transmission medium flows between the inside and the outside of the cavity through the gap over time. For this reason, the pressure inside the cavity and the pressure outside the cavity gradually reach a state of equilibrium, and the flexure of the cantilever gradually decreases and returns to the original state. Accordingly, the pressure sensor according to the aspect of the invention can detect pressure fluctuation based on the result of cantilever displacement measurement (flexural deformation measurement) by the displacement measurement unit.

In particular, since the cantilever can be formed using a semiconductor material, such as silicon, by a semiconductor process technique, the pressure sensor according to the aspect of the invention is easily reduced in thickness compared to a piezoelectric element of the related art and can detect minute pressure fluctuation with high precision.

On the other hand, when the width of the gap is large, since the pressure difference between the inside and the outside of the cavity is rarely generated, the lower limit frequency of pressure fluctuation tends to increase. When the width of the gap is small, since the pressure difference between the inside and the outside of the cavity is easily maintained, even minute pressure fluctuation is easily detected, and the lower limit frequency of pressure fluctuation tends to decrease.

When the volume of the cavity is small, similarly to when the width of the gap is large, since the pressure difference between the inside and the outside of the cavity is rarely generated, the lower limit frequency of pressure fluctuation tends to increase. When the volume of the cavity is large, similarly to when the width of the gap is small, since the pressure difference between the inside and the outside of the cavity is easily maintained, the lower limit frequency of pressure fluctuation tends to decrease.

The inventors have further studied the general relationship among the lower limit frequency, the width of the gap, and the volume of the cavity, and have found that the lower limit frequency, the width of the gap, and the volume of the cavity satisfy Expression (1). With this, simple design of only changing the width of the gap and the volume of the cavity allows the setting of the lower limit frequency of pressure fluctuation to be detected, which is difficult in a pressure sensor of the related art, to a desired value. Therefore, it is possible to obtain a high-quality pressure sensor which can arbitrarily set the frequency band of pressure fluctuation to be detected, can broadly cope with various purposes, and easily exhibits optimum performance.

(2) In the pressure sensor according to the aspect of the invention, it is preferable that the proportional constant k be in a range of 0.005 to 0.02.

In this case, when the width of the gap is in a range of 1 μm to 10 μm, and the volume of the cavity is in a range of 0.5 ml to 5 ml, it is possible to set the lower limit frequency to a desired value more accurately.

(3) In the pressure sensor according to the aspect of the invention, it is preferable that the displacement measurement unit measure the displacement of the cantilever vibrating according to the pressure difference at a frequency larger than a lower limit frequency $f_{LOW}$ (Hz) defined by Expression (2).

$$f_{LOW}=k \cdot (G^2/V) > f_{noise} \quad (2)$$

[In the expression, $f_{noise}$ is a noise frequency (Hz).]

In this case, it is possible to set the lower limit frequency of pressure fluctuation to be higher than a frequency for noise cutting. For this reason, for example, it is possible to obtain a pressure sensor which is rarely affected by atmospheric pressure fluctuation, to focus on detection of pressure fluctuation to be detected, and to further increase a value as a pressure sensor.

(4) In the pressure sensor according to the aspect of the invention, it is preferable that the displacement measurement unit have a piezoresistor formed in the base end portion.

In this case, since the piezoresistor (pressure element) is used, the cantilever can become a self-displacement detection cantilever. For this reason, it is possible to detect pressure fluctuation with higher precision.

EFFECTS OF INVENTION

With the pressure sensor according to the aspect of the invention, it is possible to detect minute pressure fluctuation with high precision, to set the lower limit frequency of pressure fluctuation to a desired value, and to arbitrarily set a frequency band of pressure fluctuation to be detected.

DETAILED DESCRIPTION OF THE INVENTION

Figure 1:
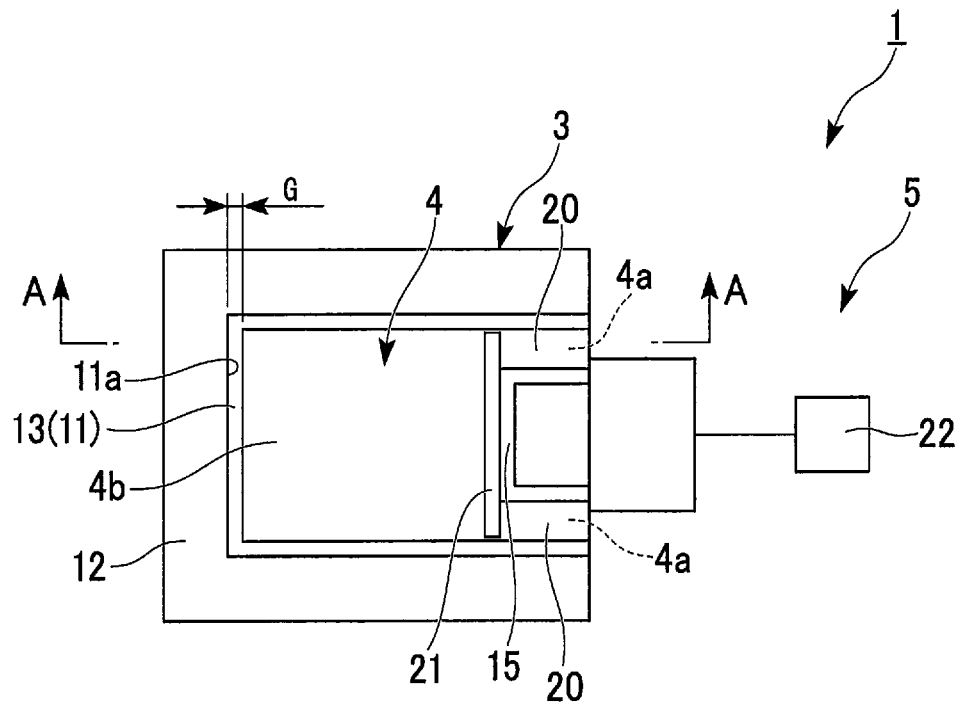
FIG. 1 is a plan view of a pressure sensor according to an embodiment of the invention.

Hereinafter, a pressure sensor according to an embodiment of the invention will be described referring to the drawings.

<Configuration of Pressure Sensor>

Figure 2:
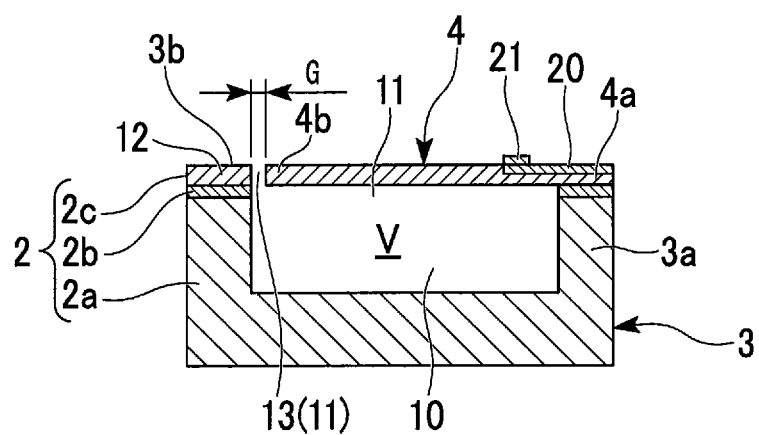
FIG. 2 is a sectional view of the pressure sensor taken along the line A-A shown in FIG. 1.

As shown in FIGS. 1 and 2, a pressure sensor 1 of this embodiment detects pressure fluctuation in a predetermined frequency band, is formed of, for example, a SOI substrate 2, in which a silicon support layer 2a, an oxidized layer 2b, such as a silicon oxide film, and a silicon active layer 2c are thermally bonded, and includes a sensor body 3, a cantilever 4, and a displacement measurement unit 5.

The sensor body 3 is formed in a bottomed tubular shape with an opening toward the upper side by the silicon support layer 2a and the oxidized layer 2b in the SOI substrate 2. The internal space of the sensor body 3 is a cavity (air chamber) 10. A portion of the opening toward the upper side of the sensor body 3 is a communicating opening 11 (the upper side of the cavity 10) which communicates the inside and the outside of the cavity 10. That is, the top surface (first surface 3b) of the sensor body 3 has the communicating opening 11 which communicates the inside and the outside of the cavity 10.

In the example shown in the drawing, although the sensor body 3 is formed in a rectangular shape in plan view, the sensor body 3 is not limited to this shape.

The cantilever 4 has a base end portion 4a and a distal end portion 4b as a free end, is formed in a plate shape extending in one direction from the base end portion 4a to the distal end portion 4b along the longitudinal direction of the sensor body 3, and is provided inside the communicating opening 11 in a state where the base end portion 4a is cantilevered by the sensor body 3.

Specifically, the cantilever 4 is formed from, for example, the silicon active layer 2c in the SOI substrate 2, and is integrally fixed to the first surface 3b in the base end portion 4a and is thus cantilevered by the sensor body 3. The cantilever 4 cantilevered by the sensor body 3 has a rectangular shape in plan view, is close to the opening end of the communicating opening 11, and substantially closes the communicating opening 11. With this, the cantilever 4 can be flexurally deformed with the base end portion 4a as a base point according to the pressure difference between the inside and the outside of the cavity 10.

A frame portion 12 which is formed from the silicon active layer 2c in the SOI substrate 2 is fixed integrally to the top surface of a portion, to which the base end portion 4a is not fixed, in a peripheral wall portion 3a of the sensor body 3. A gap 13 having a width G is formed in a U shape in plan view along the outer peripheral edge of the cantilever 4 between the outer peripheral edge of the cantilever 4 and a peripheral edge 11b of the communicating opening 11 (between the distal end portion 4b and the peripheral edge 11b).

In the example shown in the drawing, although the gap 13 is formed such that both the width of the gap in the longitudinal direction of the sensor body 3 and the width of the gap in the lateral direction of the sensor body 3 are the same width G, for example, the gap 13 may be formed such that the width of the gap in the longitudinal direction of the sensor body 3 is different from the width of the gap in the lateral direction of the sensor body 3. The gap 13 may be formed such that the width of the gap appropriately changes.

In this case, Expression (1) may be used with the width of the gap with the largest width as the width G.

The base end portion 4a of the cantilever 4 has a through-hole 15 which is formed in a U shape in plan view, and is designed such that the cantilever 4 is easily flexurally deformed. However, the shape of the through-hole 15 is not limited to the above-described shape. The through-hole 15 may not be provided optionally.

The base end portion 4a of the cantilever 4 has a pair of piezoresistors 20 which is formed with the through-hole 15 interposed therebetween in the lateral direction of the sensor body 3. Resistance values detected from the piezoresistors 20 change depending on the flexure amount (displacement amount) of the cantilever 4. A wiring 21 formed of a conductive material is connected to the respective piezoresistors 20, and the overall shape including the wiring 21 and the piezoresistors 20 is a U shape in plan view. A detection circuit 22 which measures the displacement of the cantilever 4 based on the resistance values detected from the piezoresistors 20 is connected to the piezoresistors 20.

With this, when a predetermined voltage is applied to one piezoresistor 20 through the detection circuit 22, a current caused by the voltage application bypasses the through-hole 15 and flows from one piezoresistor 20 to the other piezoresistor 20 through the wiring 21.

For this reason, the detection circuit 22 can extract the resistance values, which change depending the displacement (flexural deformation) of the cantilever 4 and are detected from the piezoresistors 20, as electrical output signals. Accordingly, the displacement of the cantilever 4 can be measured based on the output signals (sensor output), and the pressure fluctuation can be detected.

The piezoresistors 20 are formed by doping a dopant (impurity), such as phosphorous, using various methods, such as an ion implantation method and a diffusion method. An insulating film (not shown) is coated as a protective film on the top surfaces of the piezoresistors 20 and the wiring 21, and thus the piezoresistors 20 and the wiring 21 are prevented from coming into electrical contact with the outside.

The piezoresistors 20, the wiring 21, and the detection circuit 22 configure the displacement measurement unit 5 which measures the displacement of the cantilever 4.

(Operation of Pressure Sensor)

Next, a case where pressure fluctuation is detected using the pressure sensor 1 will be described.

Figure 3A:
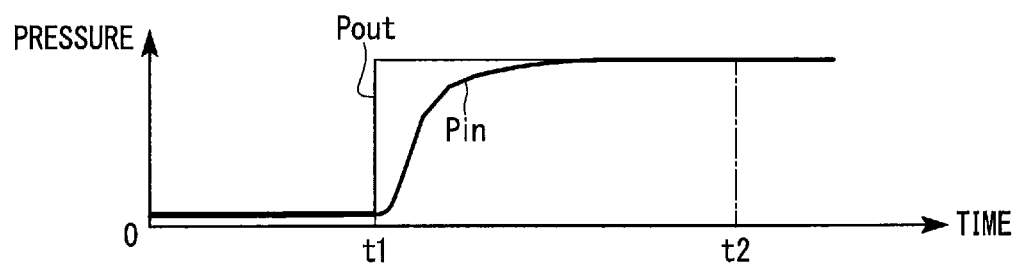
FIG. 3A is a diagram showing an example of pressure output in the pressure sensor shown in FIG. 1.
Figure 4A:
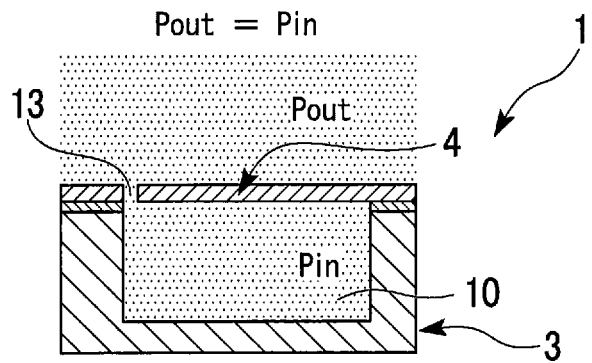
FIG. 4A is a diagram showing an example of the operation of the pressure sensor shown in FIG. 1 in a period A shown in FIG. 3A.

First, as in a period A shown in FIG. 3A, when the pressure difference between the pressure (hereinafter, referred to as an outside gas pressure $P_{out}$) outside the cavity 10 and the pressure (hereinafter, referred to as an inside gas pressure $P_{in}$) inside the cavity 10 is zero, as shown in FIG. 4A, the cantilever 4 is not flexurally deformed.

Figure 4B:
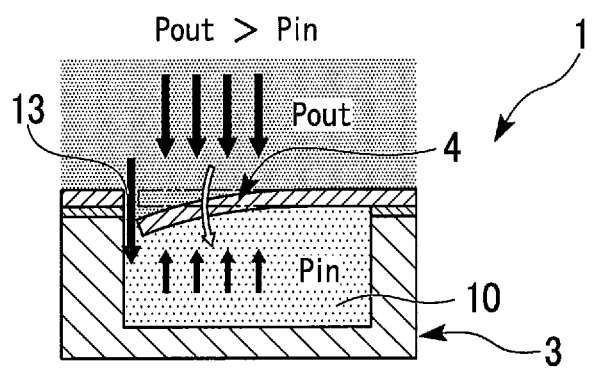
FIG. 4B is a diagram showing an example of the operation of the pressure sensor shown in FIG. 1 in a period B shown in FIG. 3A.

As shown in a period B after the time t1 in FIG. 3A, for example, when the outside gas pressure $P_{out}$ increases in a stepwise manner, a pressure difference is generated between the outside and the inside of the cavity 10. Accordingly, as shown in FIG. 4B, the cantilever 4 is flexurally deformed inward of the cavity 10.

Figure 3B:
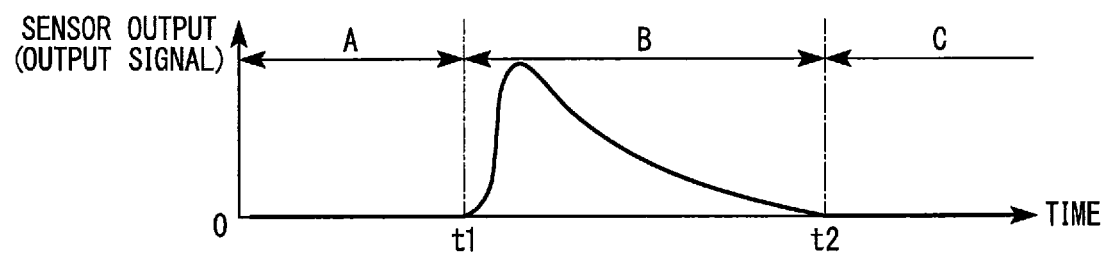
FIG. 3B is a diagram showing an example of sensor output in the pressure sensor shown in FIG. 1.

Then, strain is generated in the piezoresistors 20 according to the flexural deformation of the cantilever 4, and as the resistance values change, as shown in FIG. 3B, the output signals increase.

After the outside gas pressure $P_{out}$ increases, a pressure transmission medium flows from the outside to the inside of the cavity 10 through the gap 13. For this reason, as shown in FIG. 3A, the inside gas pressure $P_{in}$ is later than the outside gas pressure $P_{out}$ over time, and increases more gently than fluctuation in the outside gas pressure $P_{out}$.

With this, since the inside gas pressure $P_{in}$ gradually becomes close to the outside gas pressure $P_{out}$, the pressure outside the cavity 10 and the pressure inside the cavity 10 starts to reach equilibrium. Accordingly, the flexure of the cantilever 4 gradually becomes small, and as shown in FIG. 3B, the output signals gradually decreases.

Figure 4C:
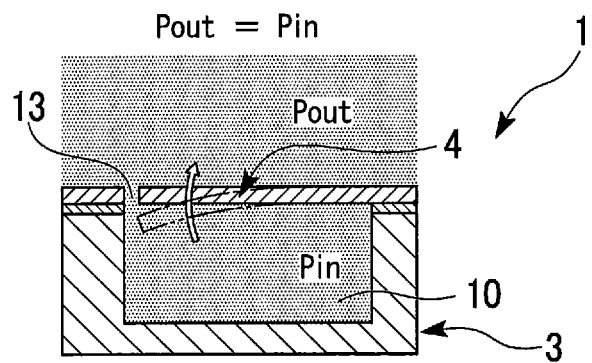
FIG. 4C is a diagram showing an example of the operation of the pressure sensor shown in FIG. 1 in a period C shown in FIG. 3A.

As shown in a period C after the time t2 in FIG. 3A, when the inside gas pressure $P_{in}$ becomes equal to the outside gas pressure $P_{out}$, as shown in FIG. 4C, the flexural deformation of the cantilever 4 is eliminated and returns to the original state, and as shown in FIG. 3B, the output signals become zero again.

In this way, pressure fluctuation can be detected by monitoring fluctuation in the output signals based on the displacement of the cantilever 4.

In particular, since the cantilever 4 can be formed using the silicon active layer 2c of the SOI substrate 2 by a semiconductor process technique, reduction in thickness (for example, tens or hundreds of nm) is easily achieved compared to a piezoelectric element of the related art. Therefore, it is possible to detect minute pressure fluctuation with high precision.

The pressure sensor 1 of this embodiment can be applied to various purposes described below.

For example, the pressure sensor can be applied to a navigation device for a vehicle. In this case, for example, a gas pressure difference can be detected based on a difference in height using the pressure sensor 1. For this reason, accurate discrimination between an elevated road and a road under an elevated road can be reflected in a navigation result.

The pressure sensor can also be applied to a portable navigation device. In this case, for example, a gas pressure difference can be detected based on a difference in height using the pressure sensor 1. For this reason, accurate discrimination regarding what floor the user is on can be reflected in a navigation result.

Furthermore, the pressure sensor can detect change in indoor gas pressure. For this reason, for example, the pressure sensor can also be applied to security devices of buildings and vehicles.

In this way, although the pressure sensor 1 can be applied to various purposes, in the pressure sensor 1 of this embodiment, the frequency band (Hz) of pressure fluctuation to be detected can be set in advance depending on the purpose of the pressure sensor 1. This point will be described below in detail.

First, an upper limit frequency can be set to the maximum resonance frequency of the cantilever 4. For this reason, for example, it is possible to set the upper limit frequency to a desired value by appropriately changing vibration characteristics with the size, material, thickness, and the like of the cantilever 4.

Next, the setting of a lower limit frequency will be described.

First, when the width G of the gap 13 is large, since the pressure difference between the inside and the outside of the cavity 10 is rarely generated, the lower limit frequency of pressure fluctuation tends to increase. When the width G of the gap 13 is small, since the pressure difference between the inside and the outside of the cavity 10 is easily maintained, even minute pressure fluctuation is easily detected, and the lower limit frequency of pressure fluctuation tends to decrease.

When the volume V of the cavity 10 is small, similarly to when the width G of the gap 13 is large, since the pressure difference between the inside and the outside of the cavity 10 is rarely generated, the lower limit frequency of pressure fluctuation tends to increase. When the volume V of the cavity 10 is large, similarly to when the width G of the gap 13 is small, since the pressure difference between the inside and the outside of the cavity 10 is easily maintained, the lower limit frequency of pressure fluctuation tends to decrease.

The inventors have further studied the general relationship among the lower limit frequency, the width G of the gap 13, and the volume of the cavity 10, and have found that the relationship among the lower limit frequency, the width G of the gap 13, and the volume V of the cavity 10 satisfies the relational expression of Expression (1).

$$\text{Lower limit frequency}(f_{LOW}) > k \cdot (G^2/V) \quad (1)$$

In the expression, G is the width (μm) of the gap 13, and V is the volume (ml) of the cavity 10. Furthermore, k is a proportional constant and is selected in a range of, for example, 0.005 to 0.02.

With this, simple design of only changing the values of the width G of the gap 13 and the volume V of the cavity 10 allows the setting of the lower limit frequency of pressure fluctuation to be detected, which is difficult in the pressure sensor of the related art, to a desired value.

Therefore, it is possible to obtain a high-quality pressure sensor 1 which can freely set both the upper limit frequency and the lower limit frequency, can arbitrarily set the frequency band of pressure fluctuation to be detected, and can broadly cope with various purposes, and easily exhibits optimum performance.

Hereinafter, the grounds for Expression (1) will be described along with the results of verification tests.

First, as described above, as will be apparent from FIGS. 3A and 3B, the flexural deformation of the cantilever 4 when pressure fluctuation is generated is in proportion to the difference (differential pressure) between the outside gas pressure $P_{out}$ and the inside gas pressure $P_{in}$. At this time, when fluctuation in the outside gas pressure $P_{out}$ is late (the frequency is small), the flexural deformation of the cantilever 4 becomes small, and the phase of the flexural deformation of the cantilever 4 with respect to the outside gas pressure $P_{out}$ is advanced, whereby the phase difference from the flexural deformation of the cantilever 4 and the outside gas pressure $P_{out}$ become large.

Figure 5A:
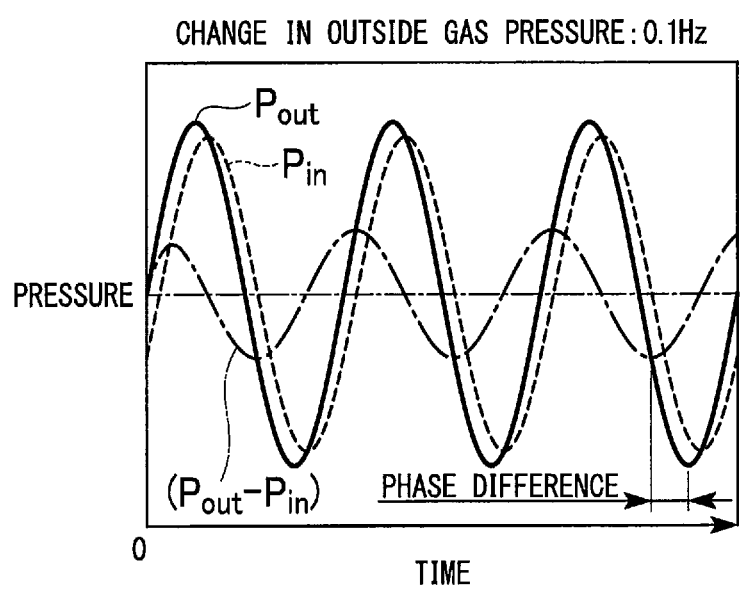
FIG. 5A is a diagram showing the relationship among an outside gas pressure, an inside gas pressure, and a differential pressure between the outside gas pressure and the inside gas pressure in the pressure sensor shown in FIG. 1 when the frequency of the outside gas pressure $P_{out}$ is 0.1 Hz.
Figure 5B:
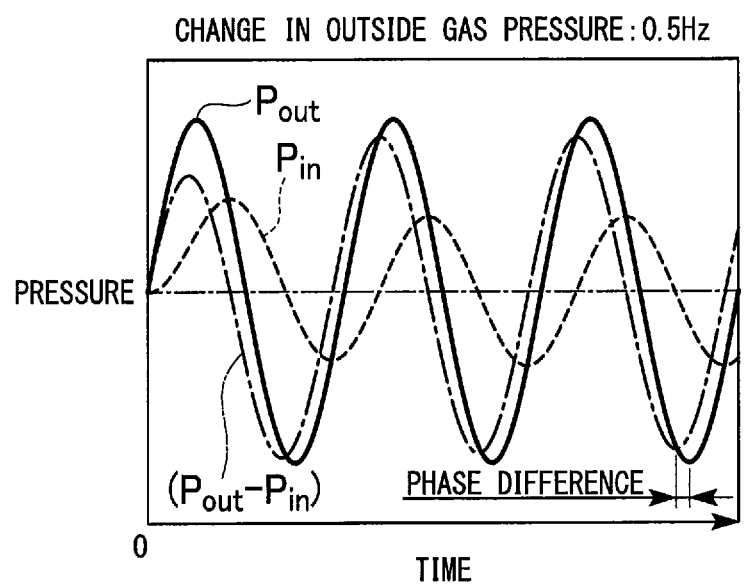
FIG. 5B is a diagram showing the relationship among an outside gas pressure, an inside gas pressure, and a differential pressure between the outside gas pressure and the inside gas pressure in the pressure sensor shown in FIG. 1 when the frequency of the outside gas pressure $P_{out}$ is 0.5 Hz.
Figure 5C:
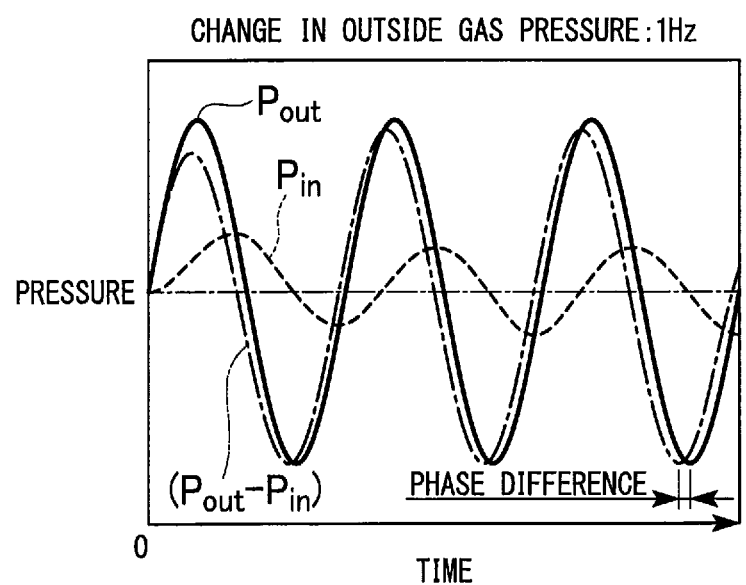
FIG. 5C is a diagram showing the relationship among an outside gas pressure, an inside gas pressure, and a differential pressure between the outside gas pressure and the inside gas pressure in the pressure sensor shown in FIG. 1 when the frequency of the outside gas pressure $P_{out}$ is 1 Hz.

FIGS. 5A to 5C show the relationship among the outside gas pressure $P_{out}$, the inside gas pressure $P_{in}$, and (the outside gas pressure $P_{out}$–the inside gas pressure $P_{in}$) when the frequency of the outside gas pressure $P_{out}$ changes.

As shown in FIGS. 5A to 5C, it is apparently recognized that the phase difference is smallest when the frequency of the outside gas pressure $P_{out}$ is 1 Hz, and increases as the frequency of the outside gas pressure $P_{out}$ decreases to 0.5 Hz and 0.1 Hz. This is commonly recognized regardless of the values of the width G of the gap 13 and the volume V of the cavity 10.

Next, the verification test result when the values of the width G of the gap 13 and the volume V of the cavity 10 change will be described referring to FIGS. 6A to 13B.

Specifically, the relationship between the outside gas pressure $P_{out}$ and the differential pressure (sensor output) between the outside gas pressure $P_{out}$ and the inside gas pressure $P_{in}$ when the values of the width G of the gap 13 and the volume V of the cavity 10 change will be verified.

FIGS. 6A, 7A, 8A, 9A, 10A, 11A, 12A, and 13A are diagrams showing the amplitude of the differential pressure between the outside gas pressure $P_{out}$ and the inside gas pressure $P_{in}$ when the frequency of the outside gas pressure $P_{out}$ changes, and FIGS. 6B, 7B, 8B, 9B, 10B, 11B, 12B, and 13B are diagrams showing the phase difference when the frequency of the outside gas pressure $P_{out}$ changes.

(Verification Test 1)

A verification test was performed for four pressure sensors in which the volume V of the cavity 10 was set to 0.5 ml and the widths G of the gap 13 was set to respective 1 μm, 3 μm, 5 μm, and 10 μm. At this time, the outside gas pressure $P_{out}$ fluctuated periodically at 1.2 pa. The pressure sensors have the same configuration as the pressure sensor 1 of the above-described embodiment, except that the width G of the gap 13 is different.

Figure 6A:
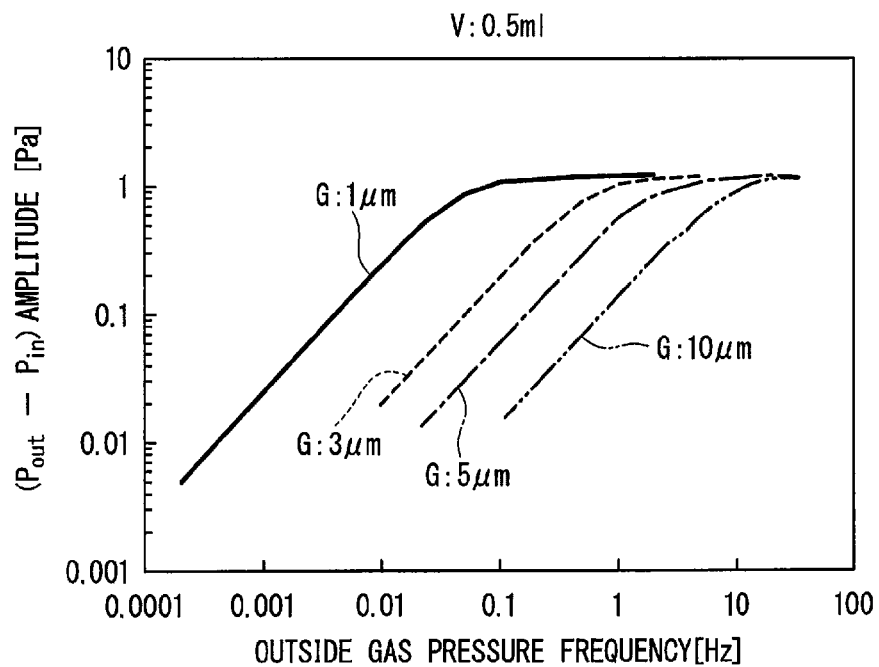
FIG. 6A is a diagram showing the relationship between the frequency of the outside gas pressure $P_{out}$ and the differential pressure (the difference between the outside gas pressure $P_{out}$ and the inside gas pressure $P_{in}$) in Verification Test 1 using the pressure sensor shown in FIG. 1.
Figure 6B:
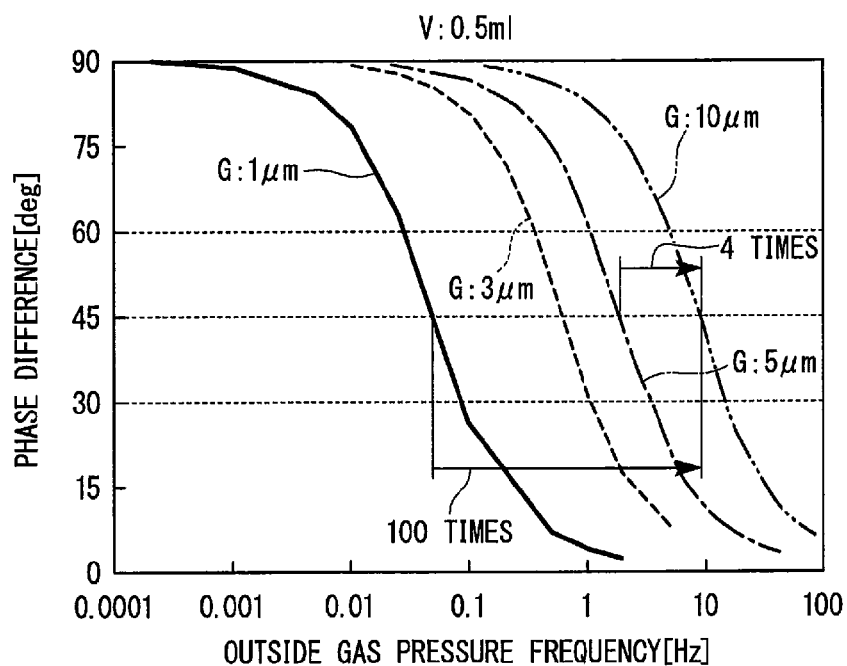
FIG. 6B is a diagram showing the relationship between the frequency of the outside gas pressure $P_{out}$ and the phase difference in Verification Test 1 using the pressure sensor shown in FIG. 1.

As a result, as shown in FIG. 6A, when the width G of the gap 13 was small, it could be confirmed that the lower limit frequency of pressure fluctuation in the outside gas pressure $P_{out}$ to be detected actually decreased. As shown in FIG. 6B, it could be confirmed that, in case of a specific phase difference, the lower limit frequency of pressure fluctuation in the outside gas pressure $P_{out}$ was substantially proportional to the square of the width G of the gap 13.

Specifically, as shown in FIG. 6B, for example, it is recognized that the lower limit frequency of a phase difference of 45 deg when the width G of the gap 13 is 10 μm is approximately 100 times the lower limit frequency of the phase difference of 45 deg when the width G of the gap 13 is 1 μm. Furthermore, it is recognized that the lower limit frequency of the phase difference of 45 deg when the width G of the gap 13 is 10 μm is approximately four times the lower limit frequency of the phase difference of 45 deg when the width G of the gap 13 is 5 μm.

(Verification Test 2)

Figure 7A:
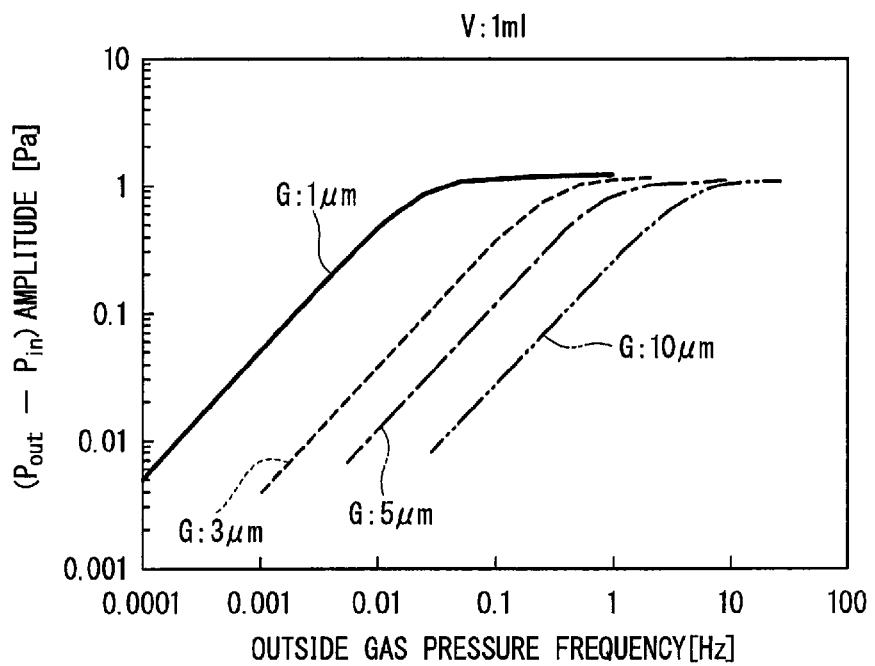
FIG. 7A is a diagram showing the relationship between the frequency of the outside gas pressure $P_{out}$ and the differential pressure (the difference between the outside gas pressure $P_{out}$ and the inside gas pressure $P_{in}$) in Verification Test 2 using the pressure sensor shown in FIG. 1.
Figure 7B:
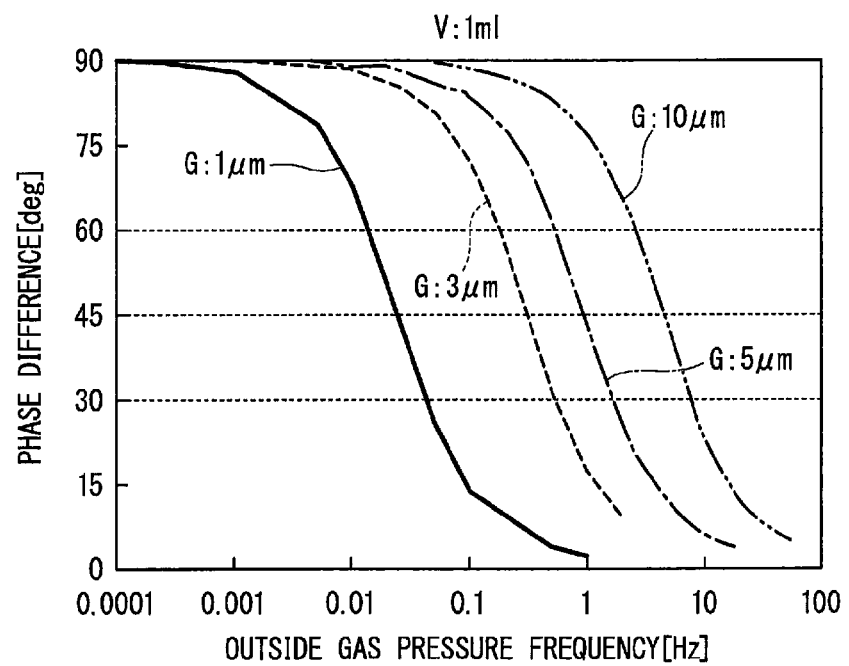
FIG. 7B is a diagram showing the relationship between the frequency of the outside gas pressure $P_{out}$ and the phase difference in Verification Test 2 using the pressure sensor shown in FIG. 1.

Next, a verification test was performed for four pressure sensors in which the volume V of the cavity 10 was set to 1 ml and the widths G of the gap 13 was set to respective 1 μm, 3 μm, 5 μm, and 10 μm. As a result, as shown in FIGS. 7A and 7B, in this case, the same effects as in Verification Test 1 could be obtained.

(Verification Test 3)

Figure 8A:
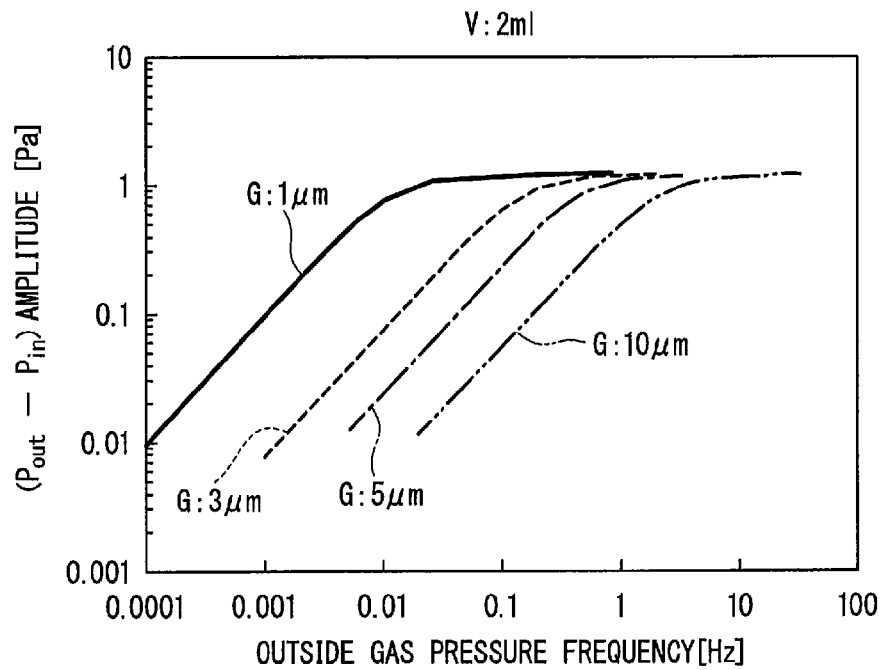
FIG. 8A is a diagram showing the relationship between the frequency of the outside gas pressure $P_{out}$ and the differential pressure (the difference between the outside gas pressure $P_{out}$ and the inside gas pressure $P_{in}$) in Verification Test 3 using the pressure sensor shown in FIG. 1.
Figure 8B:
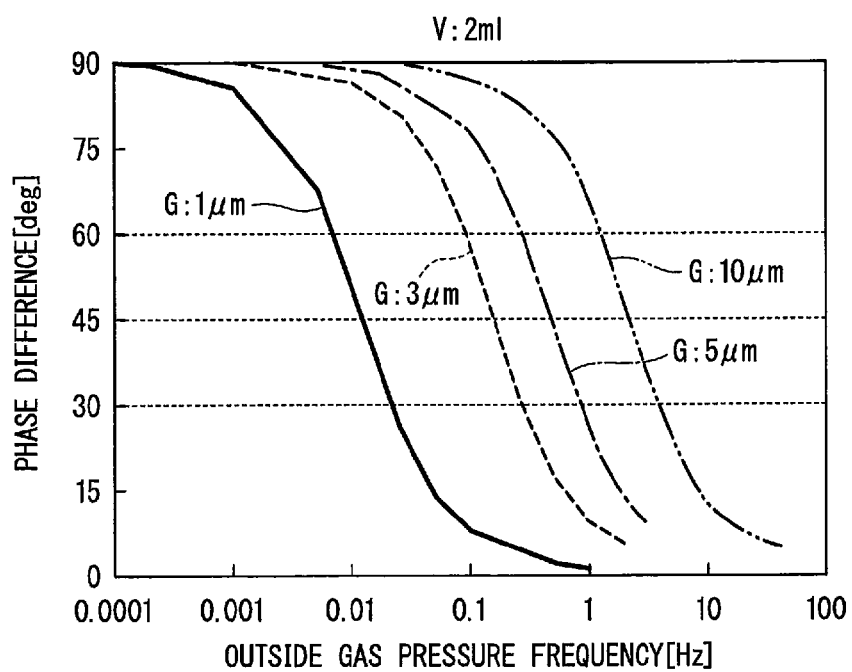
FIG. 8B is a diagram showing the relationship between the frequency of the outside gas pressure $P_{out}$ and the phase difference in Verification Test 3 using the pressure sensor shown in FIG. 1.

Next, a verification test was performed for four pressure sensors in which the volume V of the cavity 10 was set to 2 ml and the widths G of the gap 13 was set to respective 1 μm, 3 μm, 5 μm, and 10 μm. As a result, as shown in FIGS. 8A and 8B, in this case, the same effects as in Verification Test 1 could be obtained.

(Verification Test 4)

Figure 9A:
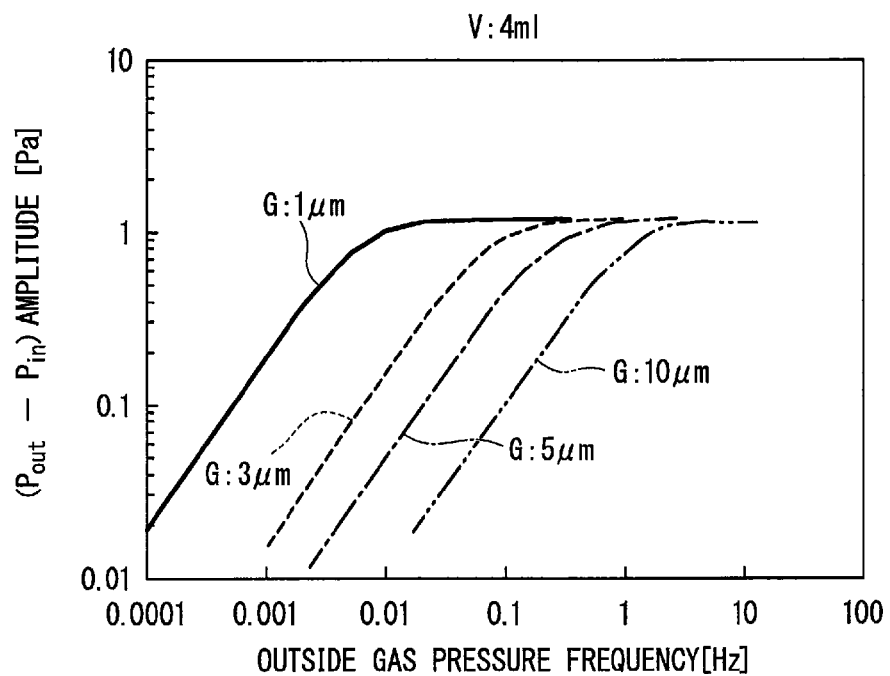
FIG. 9A is a diagram showing the relationship between the frequency of the outside gas pressure $P_{out}$ and the differential pressure (the difference between the outside gas pressure $P_{out}$ and the inside gas pressure $P_{in}$) in Verification Test 4 using the pressure sensor shown in FIG. 1.
Figure 9B:
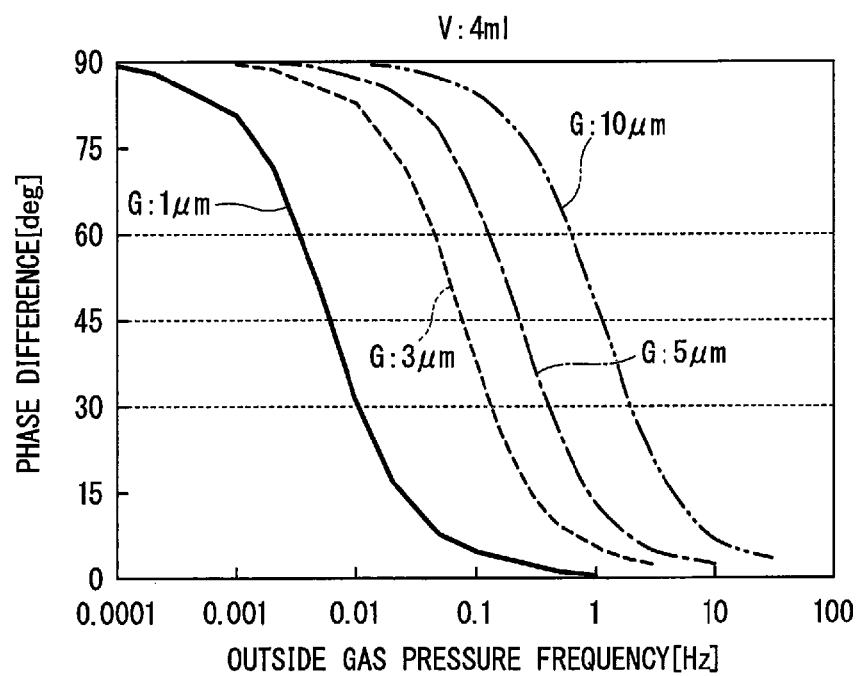
FIG. 9B is a diagram showing the relationship between the frequency of the outside gas pressure $P_{out}$ and the phase difference in Verification Test 4 using the pressure sensor shown in FIG. 1.

Next, a verification test was performed for four pressure sensors in which the volume V of the cavity 10 was set to 4 ml and the widths G of the gap 13 was set to respective 1 μm, 3 μm, 5 μm, and 10 μm. As a result, as shown in FIGS. 9A and 9B, in this case, the same effects as in Verification Test 1 could be obtained.

(Verification Test 5)

Next, a verification test was performed for four pressure sensors in which the width G of the gap 13 was set to 1 μm and the volumes V of the cavity 10 was set to respective 0.5 ml, 1 ml, 2 ml, and 4 ml. At this time, the outside gas pressure $P_{out}$ fluctuated periodically at 1.2 pa. The pressure sensors 1 have the same configuration as the pressure sensor 1 of the above-described embodiment, except that the width G of the gap 13 is different.

Figure 10A:
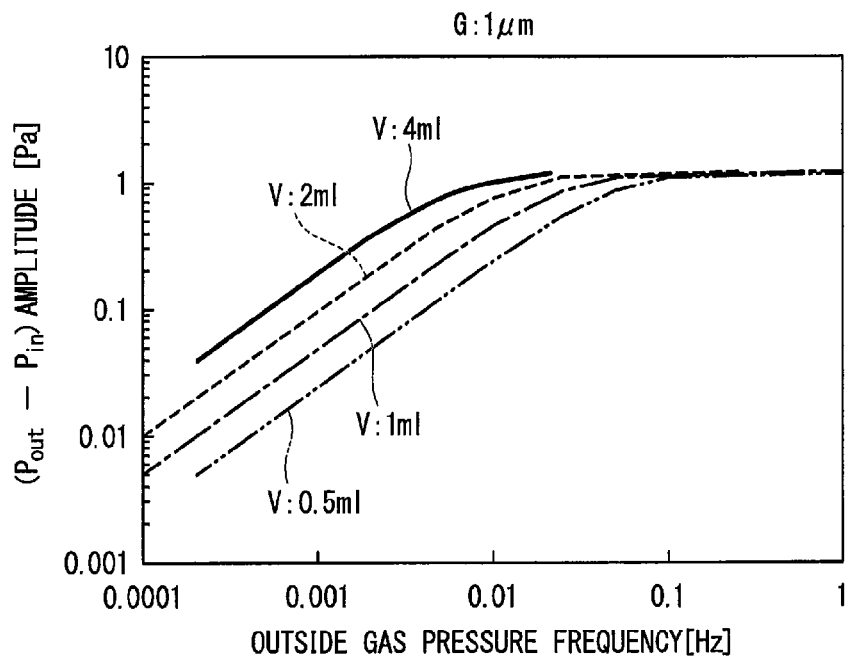
FIG. 10A is a diagram showing the relationship between the frequency of the outside gas pressure $P_{out}$ and the differential pressure (the difference between the outside gas pressure $P_{out}$ and the inside gas pressure $P_{in}$) in Verification Test 5 using the pressure sensor shown in FIG. 1.
Figure 10B:
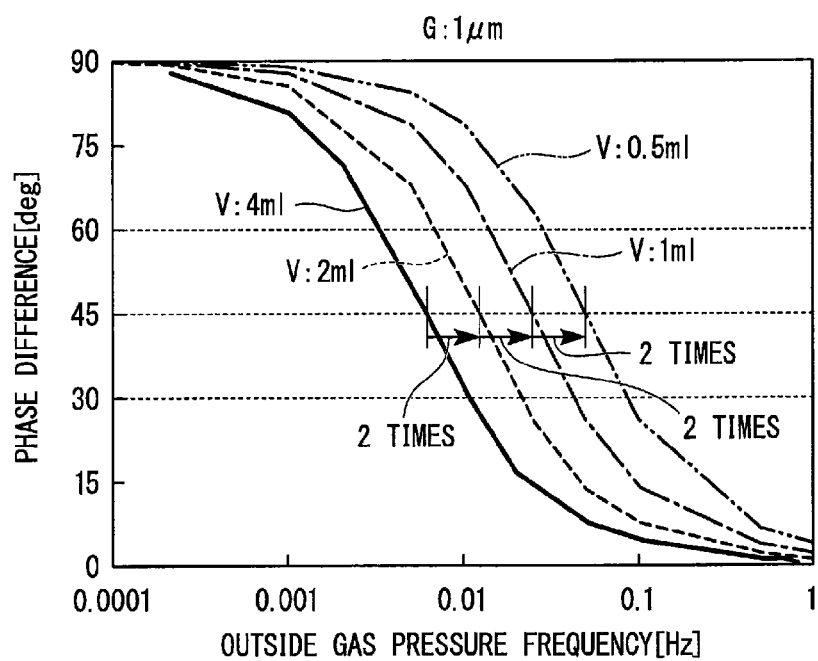
FIG. 10B is a diagram showing the relationship between the frequency of the outside gas pressure $P_{out}$ and the phase difference in Verification Test 5 using the pressure sensor shown in FIG. 1.

As a result, as shown in FIG. 10A, when the volume V of the cavity 10 was large, it could be confirmed that the lower limit frequency of pressure fluctuation in the outside gas pressure $P_{out}$ to be detected actually decreased. As shown in FIG. 10B, it could be confirmed that, in case of a specific phase difference, the lower limit frequency of pressure fluctuation in the gas pressure $P_{out}$ was in substantially inverse proportion to the volume V of the cavity 10.

Specifically, as shown in FIG. 10B, for example, it is recognized that the lower limit frequency of the phase difference of 45 deg increases by approximately two times as the volume V of the cavity 10 decreases in an order of 4 ml, 2 ml, 1 ml, and 0.5 ml.

(Verification Test 6)

Figure 11A:
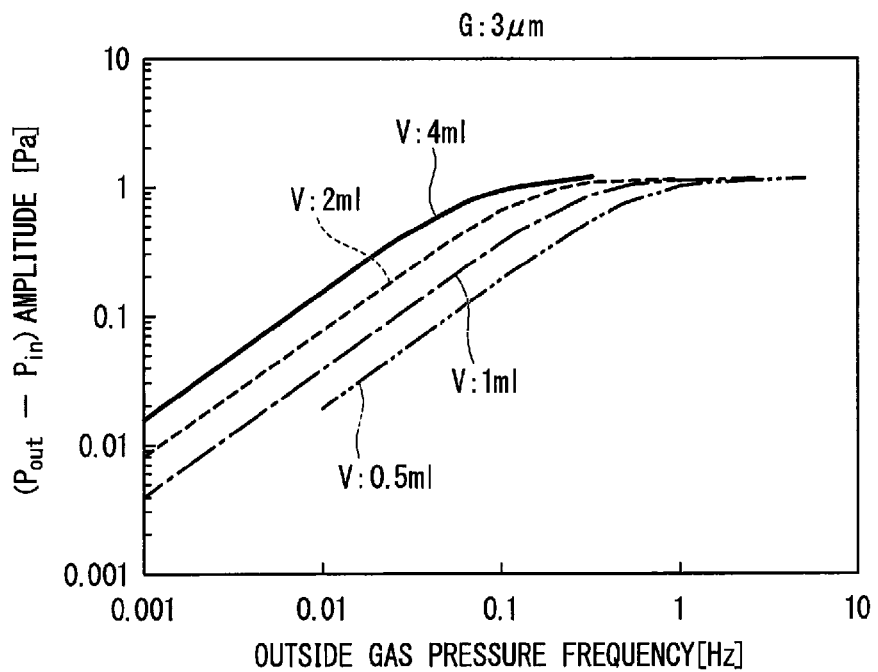
FIG. 11A is a diagram showing the relationship between the frequency of the outside gas pressure $P_{out}$ and the differential pressure (the difference between the outside gas pressure $P_{out}$ and the inside gas pressure $P_{in}$) in Verification Test 6 using the pressure sensor shown in FIG. 1.
Figure 11B:
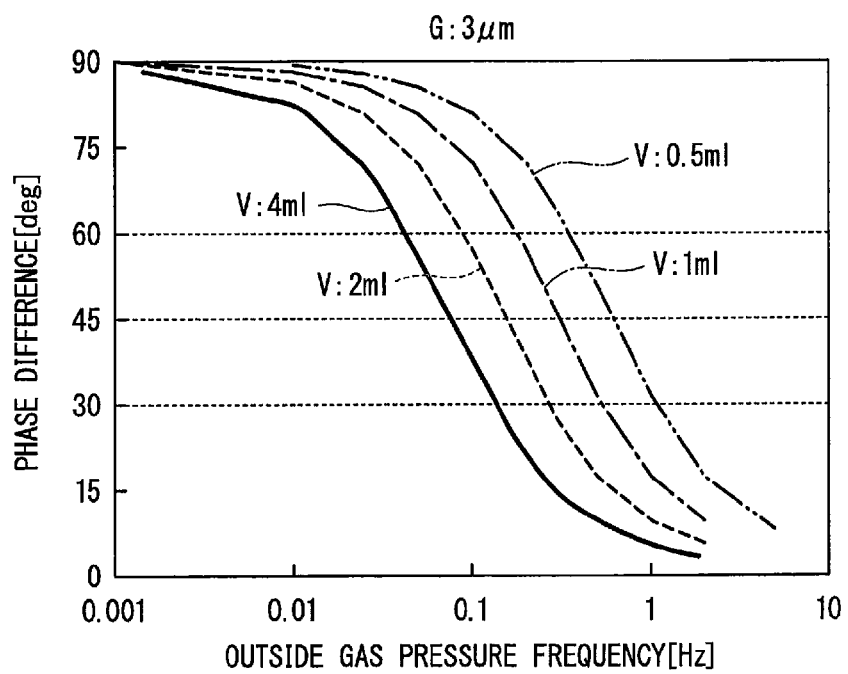
FIG. 11B is a diagram showing the relationship between the frequency of the outside gas pressure $P_{out}$ and the phase difference in Verification Test 6 using the pressure sensor shown in FIG. 1.

Next, a verification test was performed for four pressure sensors in which the width G of the gap 13 was set to 3 μm and the volumes V of the cavity 10 was set to respective 0.5 ml, 1 ml, 2 ml, and 4 ml. As a result, as shown in FIGS. 11A and 11B, in this case, the same effects as in Verification Test 5 could be obtained.

(Verification Test 7)

Figure 12A:
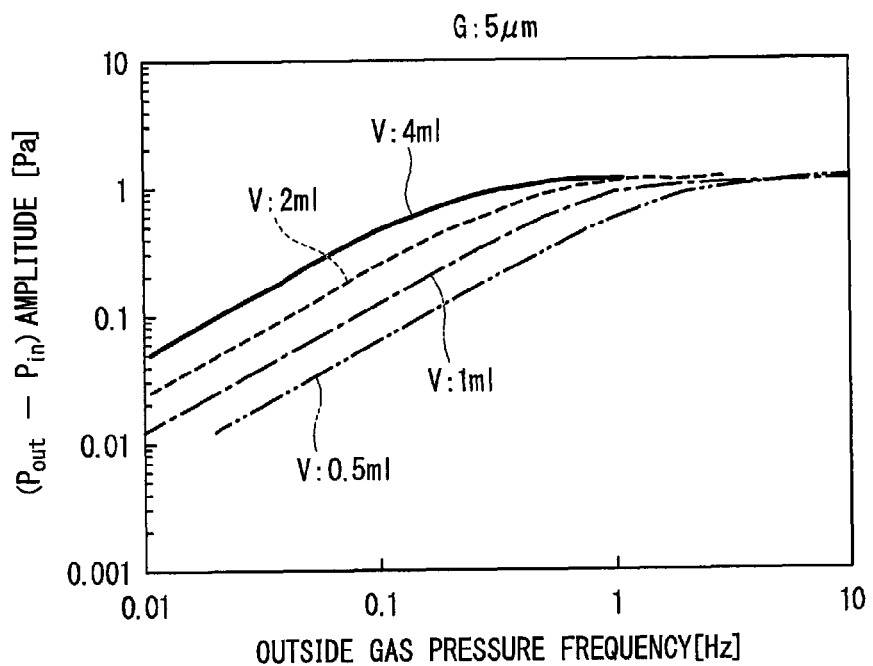
FIG. 12A is a diagram showing the relationship between the frequency of the outside gas pressure $P_{out}$ and the differential pressure (the difference between the outside gas pressure $P_{out}$ and the inside gas pressure $P_{in}$) in Verification Test 7 using the pressure sensor shown in FIG. 1.
Figure 12B:
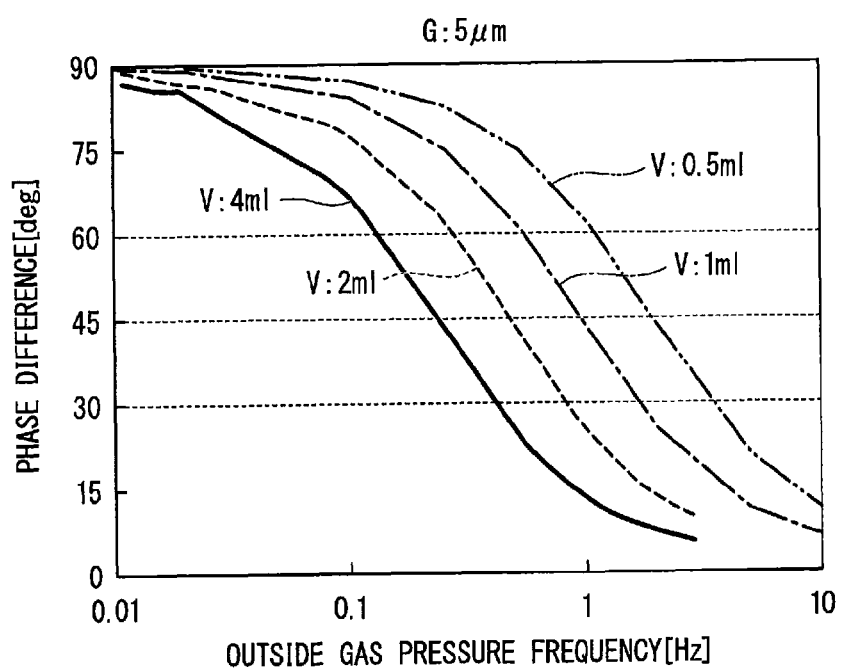
FIG. 12B is a diagram showing the relationship between the frequency of the outside gas pressure $P_{out}$ and the phase difference in Verification Test 7 using the pressure sensor shown in FIG. 1.

Next, a verification test was performed for four pressure sensors in which the width G of the gap 13 was set to 5 μm and the volumes V of the cavity 10 was set to respective 0.5 ml, 1 ml, 2 ml, and 4 ml. As a result, as shown in FIGS. 12A and 12B, in this case, the same effects as in Verification Test 5 could be obtained.

(Verification Test 8)

Figure 13A:
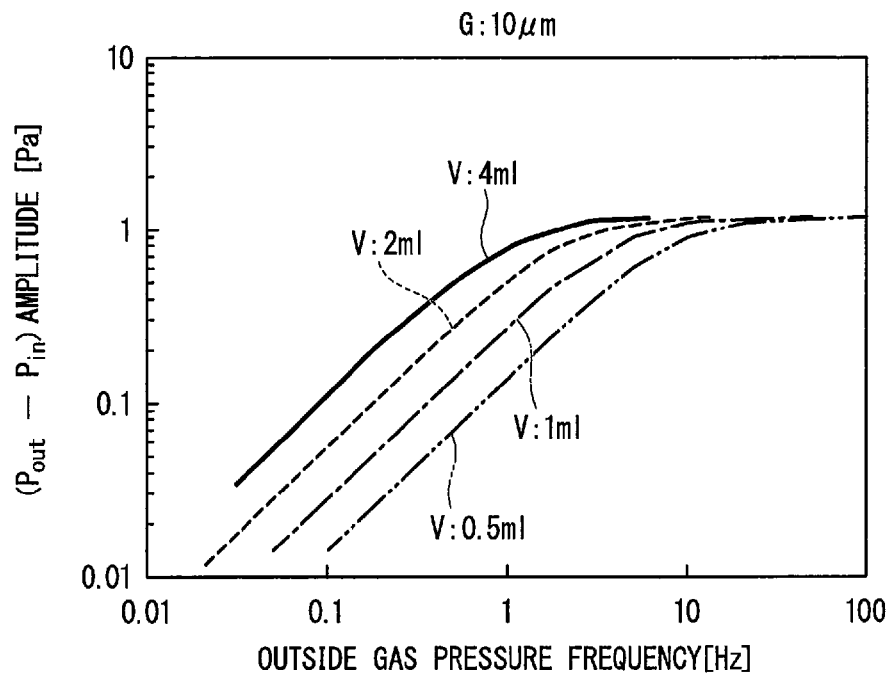
FIG. 13A is a diagram showing the relationship between the frequency of the outside gas pressure $P_{out}$ and the differential pressure (the difference between the outside gas pressure $P_{out}$ and the inside gas pressure $P_{in}$) in Verification Test 8 using the pressure sensor shown in FIG. 1.
Figure 13B:
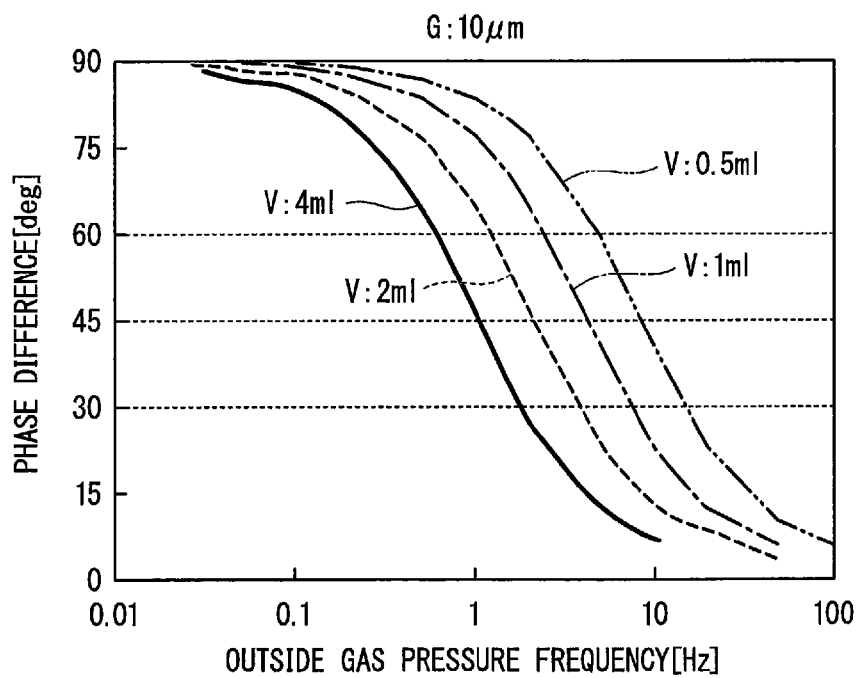
FIG. 13B is a diagram showing the relationship between the frequency of the outside gas pressure $P_{out}$ and the phase difference in Verification Test 8 using the pressure sensor shown in FIG. 1.

Next, a verification test was performed for four pressure sensors in which the width G of the gap 13 was set to 10 μm and the volumes V of the cavity 10 was set to respective 0.5 ml, 1 ml, 2 ml, and 4 ml. As a result, as shown in FIGS. 13A and 13B, in this case, the same effects as in Verification Test 5 could be obtained.

From the results of the verification tests, it was recognized that, in case of a specific phase difference, the lower limit frequency of pressure fluctuation is in proportion to the square of the width G of the gap 13 and is in inverse proportion to the volume V of the cavity 10. With this, Expression (1) could be found.

The proportional constant k is the correction value of the lower limit frequency, and is preferably selected in a range of 0.005 to 0.02. In particular, when the width G of the gap 13 is in a range of 1 μm to 10 μm, and the volume V of the cavity 10 is in a range of 0.5 ml to 5 ml, it is easy to set the lower limit frequency to a desired value more accurately.

The technical scope of the invention is not limited to the above-described embodiment, and various alterations may be made without departing from the scope of the invention.

For example, in the above-described embodiment, it is preferable that the lower limit frequency of pressure fluctuation be set based on Expression (2).

$$f_{LOW} > k \cdot (G^2/V) > f_{noise} \qquad (2)$$

In the expression, $f_{noise}$ is a noise frequency (Hz).

With this, it is possible to set the lower limit frequency of pressure fluctuation to be higher than a frequency for noise cutting. For this reason, for example, it is possible to obtain a pressure sensor which is rarely affected by atmospheric pressure fluctuation, and to further increase a value as a pressure sensor.

In the above-described embodiment, although a system in which the displacement of the cantilever 4 is measured using the piezoresistors 20 has been used, for example, a system (a so-called optical lever system) in which detection light is irradiated onto the cantilever 4, and the displacement of the cantilever 4 is measured based on the light receiving position of reflected light from the cantilever 4 may be used.

However, in the above-described embodiment, the cantilever 4 can become a self-displacement detection cantilever with the use of the piezoresistor 20. For this reason, it is easy to perform pressure fluctuation detection with high precision without being affected by external light or the like.

Figure 14:
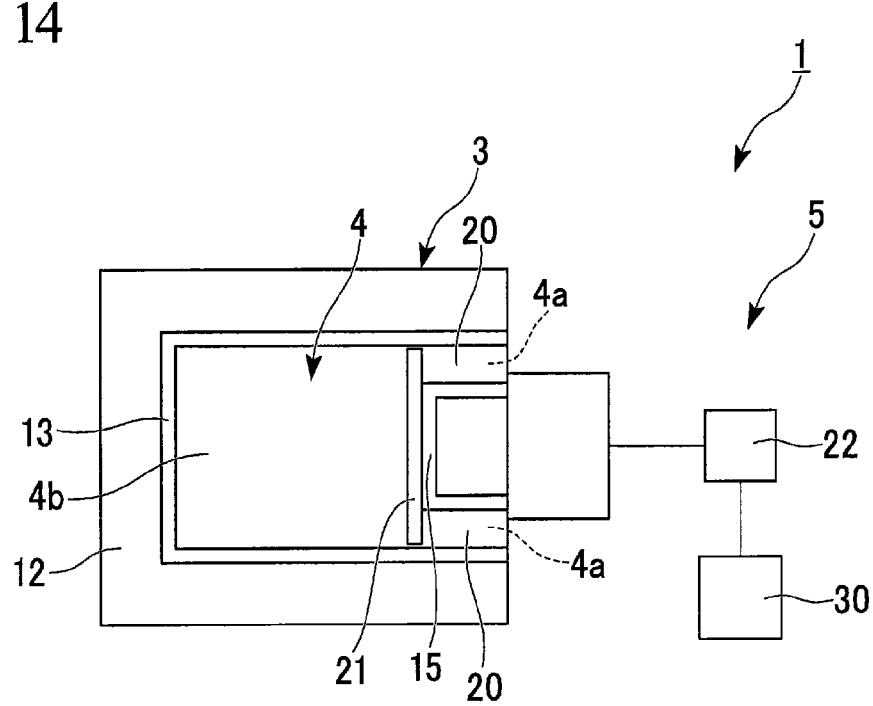
FIG. 14 is a plan view showing a modification example of a pressure sensor according to an embodiment of the invention.

In the above-described embodiment, as shown in FIG. 14, a reference cantilever 30 may be further provided, and the detection circuit 22 may detect the difference between the output of the cantilever 4 and the output of the reference cantilever 30.

The reference cantilever 30 has the same configuration as the cantilever 4, and for example, is integrally cantilevered by the sensor body 3 and fixed. However, the reference cantilever 30 is opened to outside gas and is not flexurally deformed due to pressure fluctuation in the outside gas pressure $P_{out}$.

Figure 15:
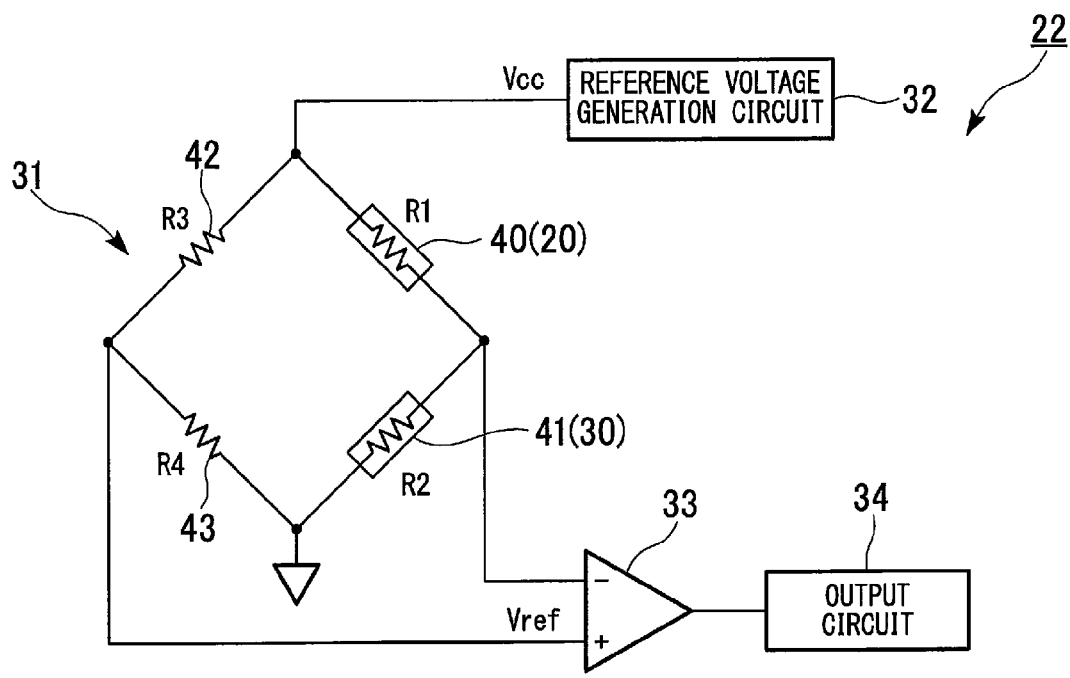
FIG. 15 is a configuration diagram showing a detection circuit shown in FIG. 14.

In this case, for example, as shown in FIG. 15, the detection circuit 22 includes a bridge circuit 31 (wheatstone bridge circuit), a reference voltage generation circuit 32, an operation amplifier circuit 33, and an output circuit 34.

In the bridge circuit 31, a branch wire, on which the piezoresistor 20 [hereinafter, referred to as a first piezoresistor 40 (resistance value R1)] of the cantilever 4 and the piezoresistor [hereinafter, referred to as a second piezoresistor 41 (resistance value R2)] of the reference cantilever 30 are connected in series, and a branch wire, on which a fixed resistor 42 (resistance value R3) and a fixed resistor 43 (resistance value R4) are connected in series, are connected in parallel with the reference voltage generation circuit 32.

In the bridge circuit 31, the connection point of the first piezoresistor 40 and the second piezoresistor 41 is connected to the inverting input terminal of the operation amplifier circuit 33, and the connection point of the fixed resistor 42 and the fixed resistor 43 is connected to the non-inverting input terminal of the operation amplifier circuit 33.

The reference voltage generation circuit 32 applies a predetermined reference voltage Vcc to the bridge circuit 31. The operation amplifier circuit 33 detects the potential difference between the connection point of the two fixed resistors 42 and 43 in the bridge circuit 31 and the connection point of the first piezoresistor 40 and the second piezoresistor 41, amplifies the potential difference with a predetermined amplification factor, and outputs the amplified potential difference.

The potential difference is the value according to the difference (R1−R2) between the resistance value of the first piezoresistor 40 and the resistance value of the second piezoresistor 41, that is, the difference between the output of the cantilever 4 and the output of the reference cantilever 30.

With the detection circuit 22 configured as above, it is possible to cancel the output fluctuation amount (noise amount) due to environmental change such as change in temperature, and disturbance such as vibration, and to extract only the output signal according to pressure fluctuation of the outside gas pressure $P_{out}$. Therefore, it is possible to detect pressure fluctuation in a desired frequency band with higher precision.

The invention claimed is:

1. A pressure sensor, comprising:
   a sensor body which has a first surface and a cavity with an opening in the first surface;
   a cantilever which has a base end portion supported on the first surface and a distal end portion provided to form a gap from a peripheral edge of the opening inside the opening, the cantilever being flexurally deformed according to a pressure difference between an inside and an outside of the cavity, the cantilever being formed of a semiconductor material; and
   a displacement measurement unit which measures a displacement of the cantilever vibrating according to the pressure difference at a frequency larger than a lower limit frequency $f_{LOW}$ (Hz) defined by Expression (1), where a width (μm) of the gap is represented by G, a volume (ml) of the cavity is represented by V, and a proportional constant is represented by k $$f_{LOW} = k \cdot (G^2/V) \qquad (1).$$

2. The pressure sensor according to claim 1, wherein the proportional constant k is in a range of 0.005 to 0.02.

3. The pressure sensor according to claim 2, wherein the displacement measurement unit measures the displacement of the cantilever vibrating according to the pressure difference at a frequency larger than a lower limit frequency $f_{LOW}$ (Hz) defined by Expression (2), $$f_{LOW} = k \cdot (G^2/V) > f_{noise} \qquad (2)$$

[In the expression, $f_{noise}$ is a noise frequency (Hz)].

4. The pressure sensor according to claim 3, wherein the displacement measurement unit has a piezoresistor formed in the base end portion.

5. The pressure sensor according to claim 2, wherein the displacement measurement unit has a piezoresistor formed in the base end portion.

6. The pressure sensor according to claim 1, wherein the displacement measurement unit has a piezoresistor formed in the base end portion.

* * * * *